(12) United States Patent
Shapira et al.

(10) Patent No.: US 7,672,400 B2
(45) Date of Patent: \*Mar. 2, 2010

(54) METHOD OF SECURE WLAN COMMUNICATION

(75) Inventors: Nir Shapira, Raanana (IL); Gilad Rozen, Ra'anana (IL)

(73) Assignee: Celeno Communications (Israel) Ltd., Ra'anana (IL)

( \* ) Notice: Subject to any disclaimer, the term of this patent is extended or adjusted under 35 U.S.C. 154(b) by 902 days.

This patent is subject to a terminal disclaimer.

(21) Appl. No.: 11/319,659

(22) Filed: Dec. 29, 2005

(65) Prior Publication Data

US 2007/0191043 A1 Aug. 16, 2007

(51) Int. Cl.
*H04L 27/00* (2006.01)
*H04B 1/00* (2006.01)
*H04B 7/00* (2006.01)

(52) U.S. Cl. ............... 375/299; 375/146; 455/522

(58) Field of Classification Search ............... 375/144, 375/148, 219, 260, 267, 299, 130, 140, 146; 370/355, 342, 302, 220, 331, 343, 478, 480, 370/335; 455/63.4, 69, 273, 522, 525
See application file for complete search history.

(56) References Cited

U.S. PATENT DOCUMENTS

| | | | |
|---|---|---|---|
| 5,864,548 A * | 1/1999 | Liu | 370/320 |
| 6,166,667 A | 12/2000 | Park | |
| 6,563,858 B1 | 5/2003 | Fakatselis et al. | |
| 6,873,293 B2 | 3/2005 | Proctor, Jr., et al. | |
| 6,895,258 B1 | 5/2005 | Scherzer et al. | |
| 6,928,047 B1 | 8/2005 | Xia | |
| 6,940,843 B2 | 9/2005 | Goodall et al. | |
| 6,961,545 B2 | 11/2005 | Tehrani et al. | |
| 6,970,682 B2 | 11/2005 | Crilly, Jr. et al. | |
| 6,999,430 B2 * | 2/2006 | Holtzman et al. | 370/328 |
| 7,034,759 B2 | 4/2006 | Proctor, Jr. et al. | |
| 7,039,090 B2 | 5/2006 | Boetzel et al. | |
| 7,039,137 B1 | 5/2006 | Lauterjung et al. | |
| 7,050,402 B2 | 5/2006 | Schmidl et al. | |
| 7,088,671 B1 | 8/2006 | Monsen | |
| 7,099,380 B1 | 8/2006 | Feng et al. | |
| 7,103,326 B2 | 9/2006 | Wu et al. | |
| 7,120,468 B1 | 10/2006 | Wilhoyte et al. | |
| 7,139,321 B2 | 11/2006 | Giannakis et al. | |

(Continued)

OTHER PUBLICATIONS

Tse et al., "Fundamentals of Wireless Communication", Sep. 10, 2004, pp. 523-548. Cambridge University Press.

(Continued)

*Primary Examiner*—Tesfaldet Bocure
*Assistant Examiner*—Lawrence B Williams
(74) *Attorney, Agent, or Firm*—Pearl Cohen Zedek Latzer, LLP (57) ABSTRACT

Some demonstrative embodiments of the invention include a method device and/or system of secure communication in a wireless network using a spatial division multiple access transmission scheme. The method, according to some demonstrative embodiments may include allocating transmission power to N channels to be transmitted to one or more destination stations by N antennas, such that the power to be received by each one of the one or more destination stations is not greater, by more than a predefined power margin, than a minimum power required for reception at a desired quality of service. Other embodiments are described and claimed.

39 Claims, 5 Drawing Sheets

U.S. PATENT DOCUMENTS

| | | | |
|---|---|---|---|
| 7,139,323 B2 * | 11/2006 | Erving et al. | 375/260 |
| 7,149,254 B2 | 12/2006 | Sampath | |
| 7,289,585 B2 | 10/2007 | Sandhu et al. | |
| 7,319,888 B2 | 1/2008 | Li et al. | |
| 2002/0041635 A1 | 4/2002 | Ma et al. | |
| 2002/0061031 A1 | 5/2002 | Sugar et al. | |
| 2002/0097780 A1 * | 7/2002 | Odenwalder et al. | 375/146 |
| 2002/0146981 A1 | 10/2002 | Saint-Hilaire et al. | |
| 2002/0150168 A1 | 10/2002 | Crawford | |
| 2002/0160737 A1 | 10/2002 | Crawford | |
| 2002/0181546 A1 * | 12/2002 | Odenwalder et al. | 375/130 |
| 2002/0188750 A1 | 12/2002 | Li | |
| 2003/0112901 A1 | 6/2003 | Gupta | |
| 2003/0128658 A1 * | 7/2003 | Walton et al. | 370/208 |
| 2003/0139196 A1 * | 7/2003 | Medvedev et al. | 455/522 |
| 2004/0125820 A1 | 7/2004 | Rios | |
| 2004/0258012 A1 | 12/2004 | Ishii | |
| 2005/0025042 A1 | 2/2005 | Hadad | |
| 2005/0025176 A1 | 2/2005 | Ko et al. | |
| 2005/0030929 A1 | 2/2005 | Swier et al. | |
| 2005/0047322 A1 | 3/2005 | Sondur | |
| 2005/0047384 A1 | 3/2005 | Wax et al. | |
| 2005/0058217 A1 | 3/2005 | Sandhu et al. | |
| 2005/0063408 A1 | 3/2005 | Famolari | |
| 2005/0105629 A1 | 5/2005 | Hottinen et al. | |
| 2005/0124369 A1 * | 6/2005 | Attar et al. | 455/522 |
| 2005/0135284 A1 | 6/2005 | Nanda et al. | |
| 2005/0136933 A1 | 6/2005 | Sandhu et al. | |
| 2005/0141412 A1 | 6/2005 | Sadri et al. | |
| 2005/0147023 A1 | 7/2005 | Stephens et al. | |
| 2005/0152324 A1 | 7/2005 | Benveniste | |
| 2005/0169232 A1 | 8/2005 | Sakoda et al. | |
| 2005/0233709 A1 | 10/2005 | Gardner et al. | |
| 2005/0255892 A1 | 11/2005 | Wong et al. | |
| 2005/0286474 A1 | 12/2005 | van Zelst et al. | |
| 2006/0023803 A1 | 2/2006 | Perlman et al. | |
| 2006/0030364 A1 | 2/2006 | Olesen et al. | |
| 2006/0039312 A1 | 2/2006 | Walton et al. | |
| 2006/0062189 A1 | 3/2006 | Takeuchi | |
| 2006/0067421 A1 | 3/2006 | Walton et al. | |
| 2006/0078059 A1 * | 4/2006 | Ok et al. | 375/260 |
| 2006/0092885 A1 | 5/2006 | Brockmann et al. | |
| 2006/0104379 A1 | 5/2006 | Li et al. | |
| 2006/0109814 A1 | 5/2006 | Kuzminskiy et al. | |
| 2006/0120225 A1 | 6/2006 | Choi | |
| 2006/0140172 A1 | 6/2006 | Trainin | |
| 2006/0140290 A1 | 6/2006 | Li et al. | |
| 2006/0164972 A1 * | 7/2006 | van Rensburg et al. | 370/208 |
| 2006/0165114 A1 | 7/2006 | Diepstraten et al. | |
| 2006/0203935 A1 | 9/2006 | Li et al. | |
| 2006/0280116 A1 | 12/2006 | Ji et al. | |
| 2006/0286937 A1 | 12/2006 | Russell et al. | |
| 2006/0291439 A1 | 12/2006 | Yang et al. | |
| 2006/0291544 A1 | 12/2006 | Fischer et al. | |
| 2007/0077936 A1 | 4/2007 | Tomisawa et al. | |
| 2007/0153714 A1 * | 7/2007 | Shapira et al. | 370/310 |
| 2007/0153748 A1 * | 7/2007 | Shapira | 370/338 |
| 2007/0155353 A1 * | 7/2007 | Shapira et al. | 455/273 |
| 2007/0177681 A1 * | 8/2007 | Choi et al. | 375/260 |
| 2007/0280360 A1 | 12/2007 | Ihm et al. | |

OTHER PUBLICATIONS

Yoo et al., On the Optimality of Multi-Antenna Broadcast Scheduling Using Zero-Forcing Beamforming, pp. 1-13, Mar. 3, 2006.

International Search Report for International Application No. PCT/IL06/01491 mailed Aug. 5, 2008.

\* cited by examiner

METHOD OF SECURE WLAN COMMUNICATION

FIELD OF THE INVENTION

The present invention relates to the field of wireless communication. In particular, embodiments of the invention relate to a method of secure communication in a wireless local area network (WLAN).

BACKGROUND OF THE INVENTION

In a wireless local area network (WLAN), an access point (AP) may communicate with one or more mobile stations (STA) over a wireless communication link. In non-secure systems, signals transmitted by the AP may be detected by any station within range of the AP, including outside listening parties and unauthorized users. This raises a concern for secure WLAN communication.

For example, in a single-antenna WLAN system, the AP may transmit a signal at its maximum power output to increase network coverage and range of the communication link. The transmitted signal energy will propagate in an isotropic pattern and may be detected anywhere within the reach radius of the AP, regardless of the location of the intended recipient. Thus, transmissions in a single-antenna WLAN system may be easily intercepted by parties other than the intended recipient.

As is known in the art, beamforming may allow a collection of omni-directional simple antennas to act like a single, highly focused, directional antenna. Each transmit antenna may transmit the intended signal multiplied by a certain weight, and by dynamically controlling the weights of each antenna the transmission may be directed to a desired location. While each antenna transmits an electromagnetic wave that propagates isotropically, the assignment of different amplitudes and phases to simultaneous transmissions from the multiple antennas can create a wave interference pattern which combines coherently at a desired location to reproduce the intended signal.

Spatial division multiple access (SDMA), also known as spatial-division multiplex (SDM), is a method for multiplexing several signal streams, each one targeted to a different destination, simultaneously, by utilizing multiple antennas. A SDMA channel access method may enable the use of the same frequency at the same time in different spaces. For example, multiple formed beams may be transmitted to several remote stations simultaneously. Typically, a plurality of orthogonal beams may be formed such that power directed towards intended destination stations is maximized, while the interference generated to other stations may be minimized.

In a multiple-antenna communication system, beamforming may be used to increase the link budget of a communication link by directing the emitted energy towards the location of an intended recipient. Thus, a potential interceptor, having a spatial signature different from that of the intended recipient, may receive a lower energy signal, resulting in a somewhat diminished signal-to-noise ratio (SNR). However, the interceptor may still be able to decode the signal.

In a SDMA system, an interceptor, having a different spatial signature than an intended recipient, may receive additional interference caused by superposition of the other station signals, resulting in a degraded signal-to-noise ratio (SNR) due to both decreased energy and increased noise. Still, there are many situations in which this SNR degradation is limited, for example, when the number of intended recipients, K, is significantly smaller than the number of transmitting antennas, thereby undesirably improving the chances of the interceptor to detect the SDMA signal.

SUMMARY OF SOME DEMONSTRATIVE EMBODIMENTS OF THE INVENTION

Some demonstrative embodiments of the invention provide systems and methods to improve communication security of a wireless network, for example, by controllably degrading the quality, e.g., signal-to-noise ratio (SNR), of signals received by non-intended recipients of transmissions in the wireless network, while maintaining a desired quality of service (QoS) level for signals received by one or more, individually selectable, intended recipients of the transmissions.

Some demonstrative embodiments of the systems and methods of the invention may be used in conjunction with a wireless local area network (WLAN), in which an access point transmits via multiple antennas using a spatial division multiple access (SDMA) transmission scheme. For example, some embodiments of the invention may be implemented by an access point (AP) able to perform a downlink transmission to a set of intended recipients according to a beamforming scheme, and/or a power allocation scheme which may be adapted, for example, to improve security of the downlink transmission, e.g., while degrading the quality of reception of other devices receiving signals of the downlink transmission.

According to some demonstrative embodiments of the invention, the AP may generate a set of spatial channels, e.g., N spatial channels, to be transmitted, using a set of respective antennas, e.g., N antennas, to a set of destination stations, e.g., K destination stations, by applying a precoding matrix to a set of inputs. The set of inputs may include, for example, a set of transmissions, e.g., K transmissions, intended to the set of destination stations, respectively, and one or more dither sequences.

According to some demonstrative embodiments of the invention, the precoding matrix may include K beamforming vectors based on channel state information of the K stations, respectively, and one or more additional vectors orthogonal to the beamforming vectors.

Utilizing such residual orthogonality to add noise to the secure transmission may result in a degraded SNR for a potential interceptor, while maintaining a desired level of transmission quality for the intended recipients, as the additional noise is transmitted on spatial channels orthogonal to the channels used for the intended recipients.

Additionally or alternatively, according to some demonstrative embodiments of the invention the AP may allocate transmission power to the set of channels such that the power to be received by each of the set of the destination stations is not greater, by more than a predefined power margin, than a minimum power required for reception at a desired quality of service. For example, a tunable system parameter according to embodiments of the invention may indicate a desired level of trade-off between performance, e.g., as may be measured by data throughput and/or signal quality, and security of the transmission for a particular destination station. Thereby, systems and methods of the invention may dramatically lower the probability that unintended recipients would be able to decode the secure transmissions.

In some embodiments of the invention, the aspects outlined above may be implemented concurrently in a single system that both adds orthogonal noise dither sequences, to increase noise in the secure transmissions, and allocates power to avoid transmission power in excess of what is required by the intended recipient, to decrease signal power of the secure transmissions. In such an embodiment, the power allocation scheme may distribute remaining power to the additional noise dither sequences.

Alternatively, the aspect of adding orthogonal noise dither sequences may be implemented separately in a system including a weight calculation module in accordance with embodiments of the invention.

Alternatively, the aspect of allocating power to avoid transmission power in excess of what is required by the intended recipient may be implemented separately in a system including a power allocation module in accordance with embodiments of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF SOME DEMONSTRATIVE EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

It should be appreciated that according to some embodiments of the present invention, the method described below may be implemented in machine-executable instructions. These instructions may be used to cause a general-purpose or special-purpose processor that is programmed with the instructions to perform the operations described. Alternatively, the operations may be performed by specific hardware that may contain hardwired logic for performing the operations, or by any combination of programmed computer components and custom hardware components.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that the present invention may be used in a variety of applications. Although the present invention is not limited in this respect, the circuits and techniques disclosed herein may be used in many apparatuses such as personal computers, stations of a radio system, wireless communication system, digital communication system, satellite communication system, and the like.

Stations intended to be included within the scope of the present invention include, by way of example only, wireless local area network (WLAN) stations, wireless personal area network (WPAN) stations, two-way radio stations, digital system stations, analog system stations, cellular radiotelephone stations, and the like.

Types of WLAN communication systems intended to be within the scope of the present invention include, although are not limited to, "IEEE-Std 802.11, 1999 Edition (ISO/IEC 8802-11: 1999)" standard, and more particularly in "IEEE-Std 802.11b-1999, Supplement to 802.11-1999, Wireless LAN MAC and PHY specifications: Higher speed Physical Layer (PHY) extension in the 2.4 GHz band", "IEEE-Std 802.11a-1999, Higher speed Physical Layer (PHY) extension in the 5 GHz band" standard, and the like.

Types of WLAN stations intended to be within the scope of the present invention include, although are not limited to, stations for receiving and transmitting spread spectrum signals such as, for example, Frequency Hopping Spread Spectrum (FHSS), Direct Sequence Spread Spectrum (DSSS), Orthogonal Frequency-Division Multiplexing (OFDM) and the like.

Devices, systems and methods incorporating aspects of embodiments of the invention are also suitable for computer-communication network applications, for example, intranet and Internet applications. Embodiments of the invention may be implemented in conjunction with hardware and/or software adapted to interact with a computer communication network, for example, a local area network (LAN), a wide area network (WAN), or a global communication network, for example, the Internet.

Figure 1:
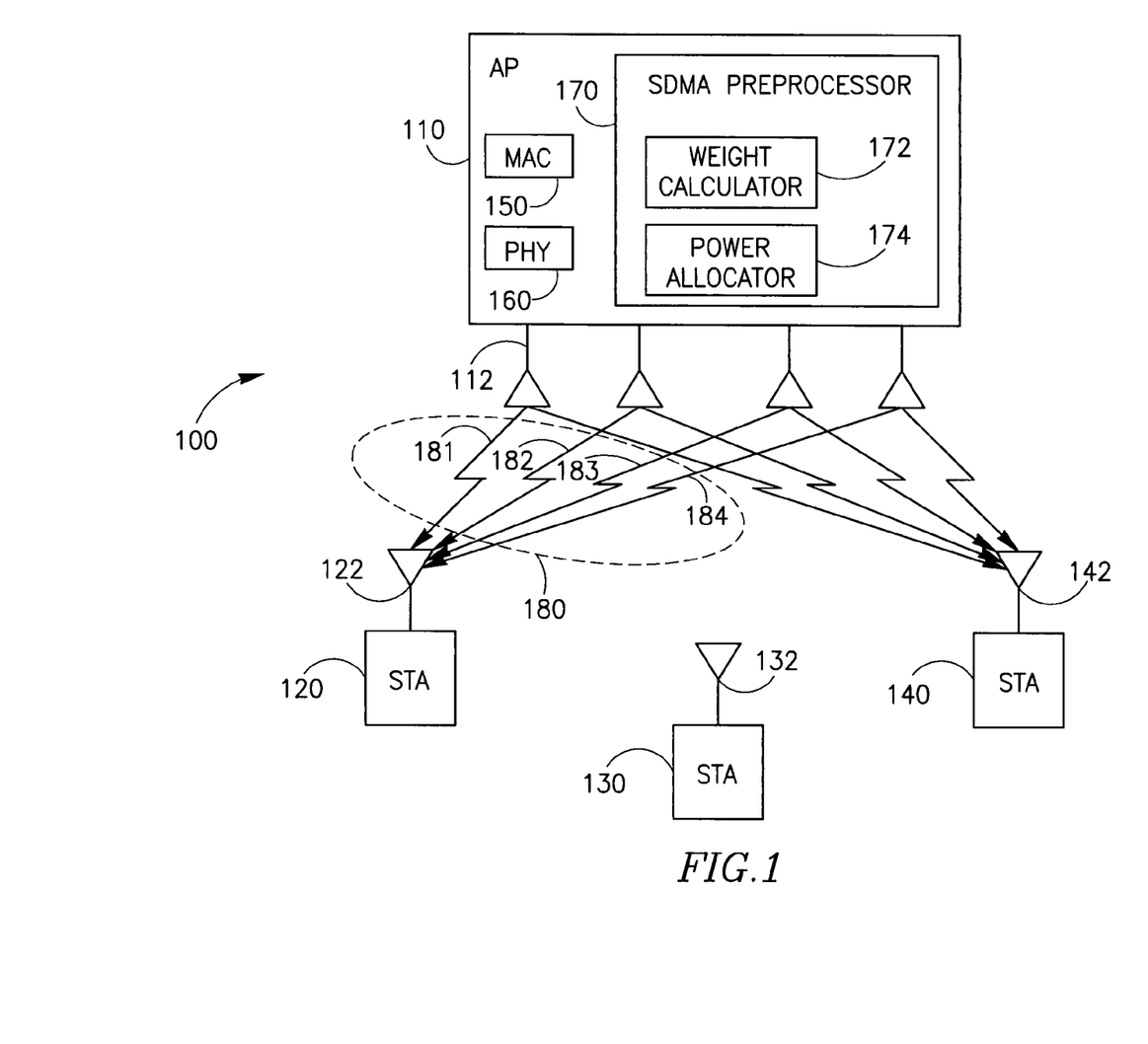
FIG. 1 is a schematic diagram of a system of wireless communication in accordance with some demonstrative embodiments of the invention.

Reference is made to FIG. 1, which schematically illustrates a wireless communication system 100 in accordance with a demonstrative embodiment of the present invention. It will be appreciated by those skilled in the art that the simplified components schematically illustrated in FIG. 1 are intended for demonstration purposes only, and that other components may be required for operation of the wireless devices. Those of skill in the art will further note that the connection between components in a wireless device need not necessarily be exactly as depicted in the schematic diagram.

Although the scope of the present invention is not limited to this example, wireless communication system 100 may include an AP 110 having multiple transmit antennas 112, e.g., suitable for SDMA transmission. System 100 may also include one or more stations (STAs), e.g., stations 120, 130 and 140 having radio frequency antennas 122, 132 and 142, respectively, to receive transmissions from AP 110.

According to some demonstrative embodiments of the invention, AP 110 may include a SDMA preprocessor 170 to determine one or more preceding values to be applied to one or more transmissions to one or more respective receivers, as described below. For example, preprocessor 170 may include one or more modules, e.g., a weight calculation module 172 to calculate beamforming weights according to a beamforming scheme of the present invention; and/or a power allocation module 174 to selectively allocate power for transmitted signals according to a power allocation scheme of the present invention, as described in detail below. Although the invention is not limited in this respect, preprocessor 170 may include high-bandwidth inputs, e.g., for receiving channel estimates; and and/or high-bandwidth outputs, e.g., for providing the precoding values. Preprocessor 170 may be implemented using any suitable combination of memory, hardwired logic, and/or general-purpose or special-purpose processors, as is known in the art. In accordance with different demonstrative embodiments of the invention, preprocessor 170 may be implemented as a separate entity or as subsystem of either a Media Access Controller (MAC) 150 and/or a Physical Layer (PHY) 160, e.g., as described below with reference to FIG. 2.

Antennas 112, 122, 132, and 142 may include, for example, a dipole antenna, omnidirectional antenna, semi-omnidirectional antenna, and/or any other type of antenna suitable for transmission and/or reception of radio frequency signals.

According to some demonstrative embodiments of the invention, AP 110 may communicate with one or more of stations 120, 130, and 140 via one or more wireless communication links, e.g., a downlink 180 and an uplink 190 (not shown). For example, downlink 180 may include one or more wireless channels e.g., spatial channels 181-184 corresponding to the plurality of antennas 112.

In accordance with some demonstrative embodiments of the invention, AP 110 may transmit to one or more of STA 120, 130, and/or 140 via the multiple antennas 112 using a SDMA transmission scheme, as explained in detail below with reference to FIG. 2, 3 and/or 4. For example, AP 110 may utilize SDMA transmission to focus a desired signal at one or more desired locations, e.g., the locations of STA 120 and 140, as shown. The transmission process may be controlled by MAC 150.

Although the invention is not limited in this respect, MAC 150 may perform functions of the data link layer of the seven-layer Open Systems Interconnect (OSI) model of network communication protocols, as known in the art. For example, during transmission MAC 150 may receive user data from higher network layers, e.g., data intended for stations 120 and 130, as shown. MAC 150 may delimit the user data into frames to be processed by PHY 160, as explained in detail below with reference to FIG. 2.

According to some demonstrative embodiments of the invention, AP 110 may generate a set of spatial channels, e.g., N spatial channels, to be transmitted, using antennas 112, to a set of destination stations, e.g., K destination stations including one or more of stations 120, 130 and 140, by applying a precoding matrix to a set of inputs including a set of transmissions, e.g., K transmissions, intended to the set of destination stations, respectively, and one or more dither sequences, e.g., as described in detail below. The precoding matrix may include, for example, a set of beamforming vectors, e.g., K beamforming vectors, which may be based, for example, on channel state information of the set of destination stations, respectively; and one or more additional vectors orthogonal to the beamforming vectors.

According to some demonstrative embodiments of the invention, in addition to or instead of applying the precoding matrix described above, AP 110 may allocate transmission power to the set of channels such that the power to be received by each of the set of destination stations may not be greater than a minimum power required for reception at a desired quality of service, for example, by more than a predefined power margin, as described in detail below.

Figure 2:
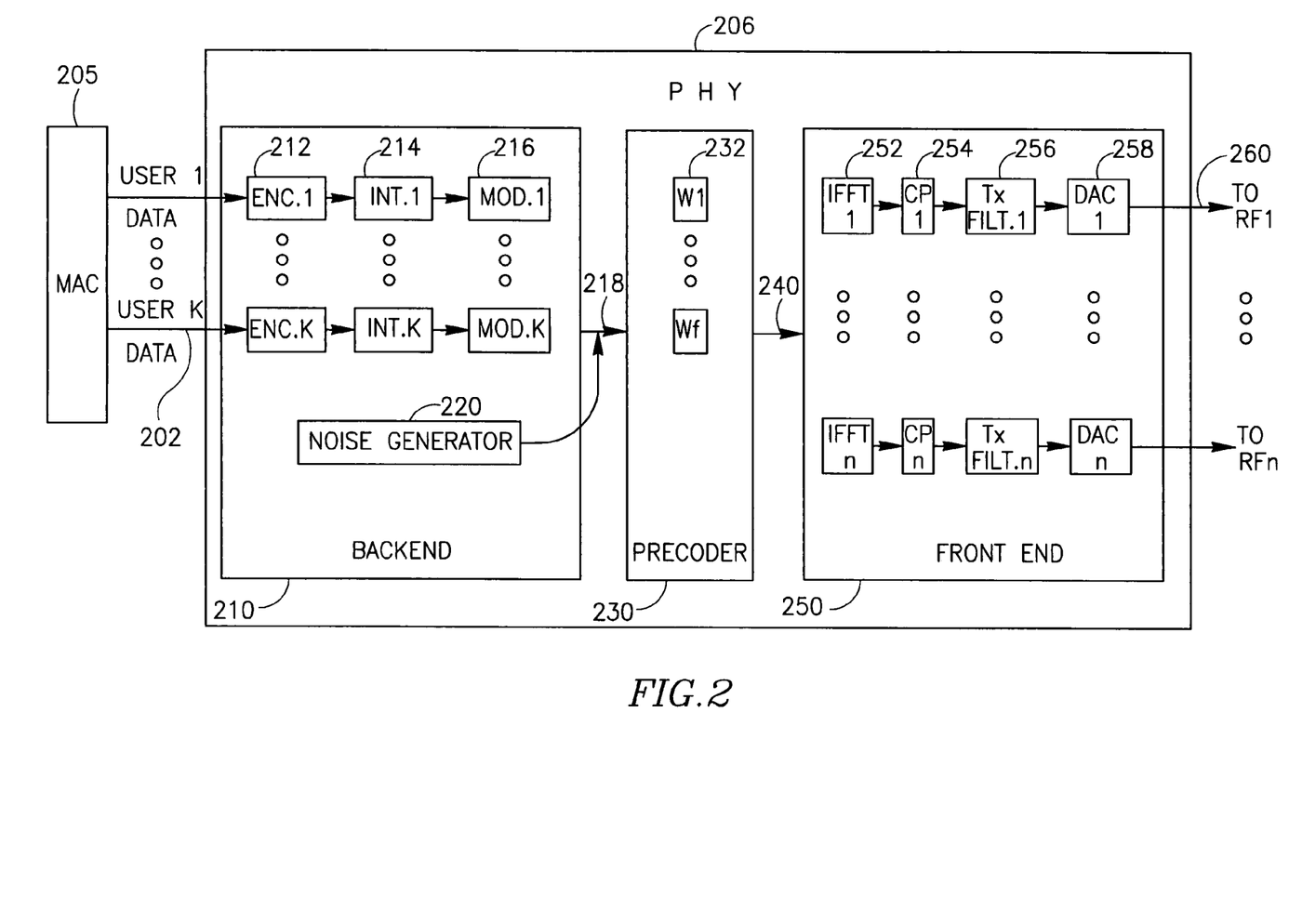
FIG. 2 is a schematic diagram of components of an access point in accordance with some demonstrative embodiments of the invention.

Reference is made to FIG. 2, which schematically illustrates components of an access point 200 in accordance with some demonstrative embodiments of the invention. Although the invention is not limited in this respect, access point 200 may perform the functionality of AP 110 (FIG. 1).

According to some non-limiting demonstrative embodiments of the invention, AP 200 may be adapted to perform combined Orthogonal Frequency Division Multiplexing (OFDM)-SDMA transmission. For example, simultaneous SDMA transmission to K destination stations using N transmit antennas may be performed independently for each frequency in an OFDM modulation scheme having F frequencies, as explained in detail below. It will be appreciated that other transmission schemes are possible, for example, SDMA may be combined with Direct Sequence Spread Spectrum (DSSS) signals used in the 802.11b standard, or any other suitable modulation scheme as is known in the art. For example, in a DSSS-SDMA transmission system, SDMA preceding may be performed in the time domain, as opposed to frequency domain preceding for the OFDM case.

Although the invention is not limited in this respect, AP 200 may include a MAC 205, and/or a PHY 206. MAC 205 may send to PHY 206 a plurality of user data signals 202, e.g., K user data signals, containing frames of data for the K intended recipients, respectively. PHY 206 may include a backend 210, a precoder 230, and/or a frontend 250, as are described below.

According to some demonstrative embodiments of the invention, backend 210 may include a plurality of branches, e.g., K branches to handle the user data of signals 202, e.g., as described below. Precoder 230 may apply a plurality of precoding values to the branches of signals 202. For example, precoder 230 may apply one or more precoding matrices, e.g., F preceding matrices, to multiplex the data of the K users to N antennas in each of the F frequency bins. Frontend 250 may include N branches for processing the signals to be transmitted over the N antennas.

According to some demonstrative embodiments of the invention, each of user data signals 202 may be processed, for example, by a separate branch of backend 210. For example, a backend branch of backend 210 may include an encoder 212 to perform Forward Error Correction (FEC), an interleaver 214 to perform a permutation of the bits, and a modulator 216 to map the data bits into constellation points that may be modulated in different frequency bins. It will be appreciated that such backend operations may be in accordance with the 802.11a standard for OFDM wireless communication, as is known in the art. In addition, encoder 212, interleaver 214, and modulator 216 may also be adapted for use with any other suitable modulation scheme as is known in the art.

In accordance with some embodiments of the invention, backend AP 200 may also include a noise generator 220 to provide at least one noise dither sequence in addition to the K user signals. For example, noise generator 220 may be able to generate random bits and insert the random bits into the input of modulator 216 to be mapped to, constellation points along with the data bits. Alternatively, noise generator 220 may be able to insert one or more dither sequences after the modulation of user data 202 by modulator 216. Although the invention is not limited in this respect, noise generator 220 may be implemented, for example, as part of PHY 206.

According to some demonstrative embodiments of the invention, an output 218 of backend 210 may be processed by precoder 230. Output 218 may include K user data signals, corresponding to user data 202, and at least one noise signals, e.g., up to N-K noise signals, corresponding to the at least one dither sequence inserted by noise generator 220. Precoder 230 may map, for example, K user streams of output 218 into N antenna streams 240. For example, precoder 230 may apply to output 218 F orthogonal preceding matrices 232 corresponding to the F frequency bins used for OFDM, respectively.

In accordance with some demonstrative embodiments of the invention, one or more of preceding matrices 232 may include a set of beamforming vectors, e.g., K beamforming vectors, corresponding to the set of destination stations, and one or more additional vectors, e.g., up to N-K additional vectors.

According to some demonstrative embodiments of the invention, one or more of the vectors may include a set of precoding values. For example, each one of the beamforming vectors and/or the additional vectors may include N precoding values. Accordingly, each one of matrices 232 may include, for example, an N×N matrix.

According to some demonstrative embodiments of the invention one or more of the preceding values may be determined, for example, by one or more modules of SDMA preprocessor 170, e.g., weight calculation module 172 and/or power allocation module 174.

According to some demonstrative embodiments of the invention, weight calculator 172 (FIG. 1) may calculate one or more beamforming weights, e.g., as described below. Additionally or alternatively, power allocator 174 (FIG. 1) may determine one or more power allocation factors corresponding to one or more of the destination stations, e.g., as described below. One or of precoding values of matrices 232 may be determined based on the beamforming weights and/or the power allocation factors. For example, one or more precoding values of matrices 232 may be determined based on one or more products of the one or more power allocation factors and the one or more beamforming weights, respectively.

Antenna streams 240 may be processed by frontend 250, which may include N transmission branches.

Frontend 250 may include any suitable front end hardware and/or software, Although the invention is not limited in this respect, each branch of frontend 250 may include, for example, an Inverse Fast Fourier Transform 252, a Cyclic Prefix (CP) insertion module 254, a transmission filter 256, and/or a Digital to Analog Converter (DAC), e.g., as are known in the art.

Figure 3:
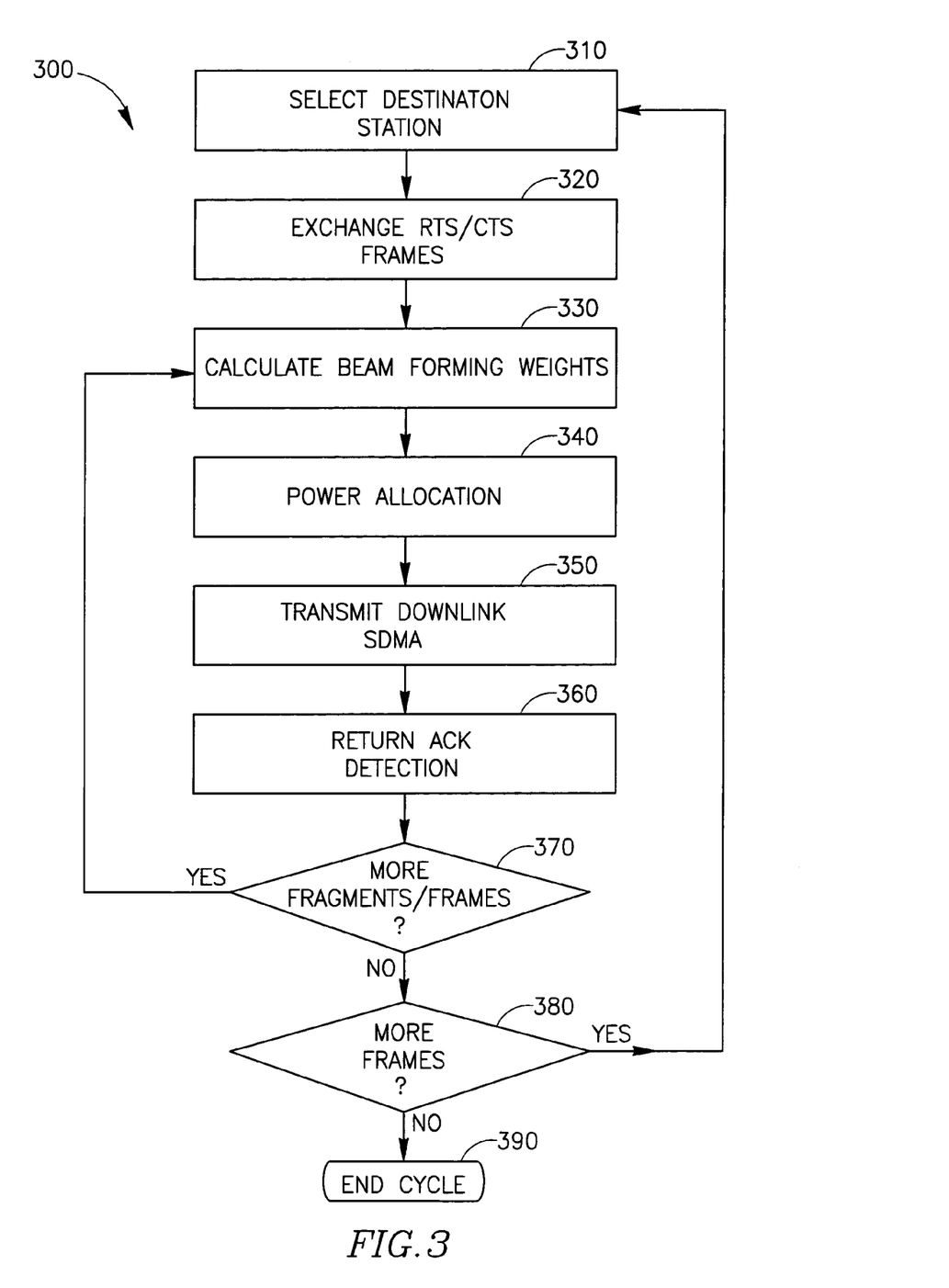
FIG. 3 is a schematic flowchart of a method of wireless transmission in accordance with one demonstrative embodiment of the invention.
Figure 4:
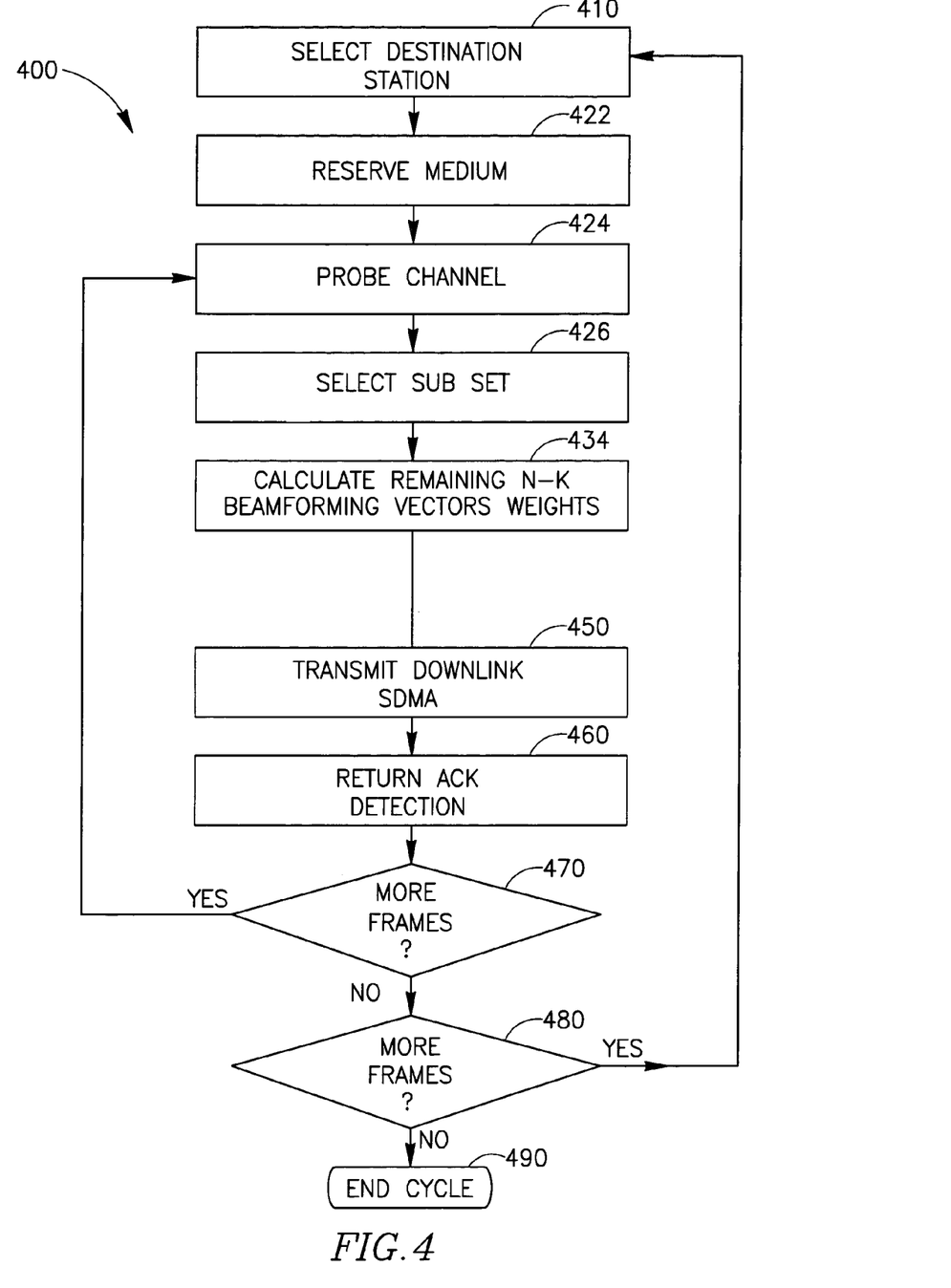
FIG. 4 is a schematic flowchart of a method of wireless transmission in accordance with another demonstrative embodiment of the invention.

Reference is made to FIG. 3, which schematically illustrates a wireless transmission method 300 in accordance with one demonstrative embodiment of the invention. Although the invention is not limited in this respect, transmission method 300 may be performed, e.g., by AP 110 (FIG. 1) to provide secure downlink transmission in a WLAN using a SDMA transmission scheme for transmission to a single user.

As indicated at block 310, transmission method 300 may include selecting a destination station. For example, MAC 150 may manage a queue of pending frames of user data for transmission. The user data may be intended for a particular recipient, and the queue may contain frames for several different intended recipients. Secure transmission method 300 may include, for example, selecting a destination station that has pending frames of user data in the outgoing queue.

As indicated at block 320, transmission method 300 may optionally include channel state information of the selected destination station. For example, the method may optionally include exchanging ready-to-send/clear-to-send (RTS/CTS) frames with the selected destination station. In accordance with some demonstrative embodiments of the invention, the transmitting AP, e.g., AP 110, may be able to estimate the selected destination station's spatial signature from the received CTS frame. For example, AP 110 may receive the return CTS frame at each of the N antennas 112, providing a replica of the received signal multiplied by a complex channel coefficient factor $h_i$ wherein i=1 ... N, known as the spatial signature of the station. As is known in the art, the spatial signature vector $h_i$ may be a representation of the channel between the AP and the recipient.

Optionally, the RTS/CTS exchange may be skipped to reduce network overhead, for example, if the transmitting AP already has an updated estimate for the destination station's spatial signature. Although the invention is not limited in this respect, an estimate may be considered up-to-date if it is obtained, e.g., within 10% of the channel coherence time. For example, in a slowly moving environment, channel coherence time may be around 300 milliseconds, and an estimate may be considered up-to-date if it is not more than 30 milliseconds old. As is known in the art, channel coherence time is a measure of the speed at which the channel characteristics change.

Although the invention is not limited in this respect, transmission of the RTS/CTS exchange may be isotropic, for example, using a suitable communication protocol as is known in the art, e.g., according to the 802.11 standards, without employing a beamforming technique. By transmitting the RTS/CTS frames isotropically, all network stations, e.g., STAs 120, 130, and 140, within range of the transmitting AP, e.g., AP 110, may be able to decode the exchange. In particular, an open RTS/CTS transmission exchange may allow the network stations to record the network allocation vector (NAV) setting in the transmitted RTS frame. As is known in the art, the NAV setting may reserve the wireless medium for a predetermined amount of time needed to carry out the subsequent transmission, e.g., a secure SDMA transmission to the selected destination station. It will be appreciated that this practice may be beneficial for reducing contention overheads, as well as for utilizing the updated channel information for several transmissions.

As indicated at block 330, secure transmission method 300 may include calculating beamforming weights, e.g., to provide values for precoding matrix 232, as explained above with reference to FIG. 2. Although the invention is not limited in this respect, in the case of secure transmission to a single user, a beamforming weight vector corresponding to the spatial signature of the selected destination station may be used. For example, a maximum ratio combining (MRC) vector may be calculated, e.g., by weight calculation module 172 of AP 110, by setting $w_i$ equal to the complex conjugate of $h_i$ for i=1 ... N. It will be appreciated by those of skill in the art that a MRC vector corresponding to the spatial signature of an intended recipient may provide an optimal set of weights for transmitting to that intended recipient, e.g., in terms of increasing SNR, as the signal may be maximized at the location of the receiving antenna.

According to some embodiments of the invention, secure transmission method 300 may include designing one or more, e.g., up to N−1, additional vectors orthogonal to the calculated beamforming vector, to represent noise dither sequences. For example, a Householder Transform technique, as is known in the art, may be used to supplement the precoding matrix, e.g., by complementing the K beamforming vectors in N-space with an additional N-K orthogonal vectors. Thus, the precoding matrix may represent up to N orthogonal spatial channels.

Additionally or alternatively, according to some embodiments of the invention, as indicated at block 340, secure transmission method 300 may include selectively allocating power to each spatial channel in accordance with a power allocation scheme of the present invention. For example, in the case of secure transmission to a single user, the power allocation scheme may assign power to the intended recipient to avoid transmission power in excess of a minimum power required for proper reception by the selected destination station. For example, the power allocation scheme may assign power that is marginally above a threshold level based on parameters of a desired level of quality and/or security. A power allocation scheme for a single user in accordance with some demonstrative embodiments of the invention is explained in detail below with reference to FIG. 5. For example, power allocator 174 may determine the power allocation factor corresponding to the destination station, e.g., as described below with reference to FIG. 5. SDMA preprocessor 170 may apply the determined factor to the beamforming vector and provide precoder 230 with precoding values based on the allocation factor and/or the beamforming weight values.

Although the invention is not limited in this respect, residual power that is not allocated to the signal transmitted to the intended recipient may be distributed among the remaining spatial channels, e.g., evenly.

As indicated at block 350, method 300 may include performing downlink SDMA transmission to the selected destination station, e.g., via physical layer 160, as explained in detail above with reference to FIG. 2. Although the invention is not limited in this respect, the preceding matrices used by the PHY during the preceding stage of transmission may comprise values corresponding to the beamforming weights and/or power allocation scheme calculated at blocks 330 and 340, respectively.

As indicated at block 360, transmission method 300 may include detecting a return acknowledgment (ACK) frame from the selected destination station after transmission. Although the invention is not limited in this respect, updated channel state information may be estimated from the ACK signal. In addition, a user frame for which an acknowledgement is received may be removed from the pending frame queue, e.g., of MAC 160. If a return ACK signal is not detected, the corresponding frame may be resent.

As indicated at decision block 370, if the outgoing queue contains additional frames of user data for the selected destination station, method 300 may return to block 330. The secure transmission method may again calculate beamforming weights, e.g., according to the updated channel state information estimated from a returned ACK signal, allocate power, and perform SDMA transmission, e.g., until all frames are exhausted.

As indicated at decision block 380, if the outgoing queue contains additional frames of user data for a different destination station, method 300 may return to block 310 to select a new destination station. As indicated at block 390, the secure transmission cycle may end when all pending data frames are exhausted.

Reference is now made to FIG. 4, which schematically illustrates a wireless transmission method 400 in accordance with another demonstrative embodiment of the invention. Although the invention is not limited in this respect, transmission method 400 may be performed, e.g., by AP 110 (FIG. 1), e.g., to provide secure downlink transmission in a WLAN using a SDMA transmission scheme for simultaneous transmission to a multiple number, K, of selected users.

As indicated at block 410, method 400 may include selecting a plurality U of stations. In accordance with embodiments of the invention, the selection criteria may include transmission priority, outgoing frames queue depth, quality of service, and the like. It will be appreciated that the number of selected stations U is not limited by the number of transmit antennas N. In the case where the selected stations exceeds number of transmit antennas (U>N), method 400 may include selecting a subset of K stations for sequential transmission, where K is less than or equal to N.

As indicated at block 422, method 400 may include reserving the wireless medium for a predetermined time period, e.g., a time period to carry out a SDMA transmission to the selected stations. For example, the transmitting AP may send a broadcast CTS-to-self frame to inform all stations within broadcast range of the AP, of the predetermined time period.

As indicated at block 424, method 400 may include estimating channel state information corresponding to one or more of the selected stations, e.g., by probing channels between the transmitting AP and the selected stations. For example, method 400 may include sequentially sending a Data-Null frame, as is known in the art, to one or more of the selected stations and receiving an ACK frame in reply. It will be appreciated that channel state information may be estimated from the returned ACK frames.

As indicated at block 426, method 400 may include selecting a subset of K intended recipients out of the U selected stations. Although the invention is not limited in this respect, the subset selection algorithm may include determining the value of K, calculating the beamforming weights for the subset members, and/or calculating the relative power allocation between the K subset members. Although the invention is not limited in this respect, subset selection and related computations may be performed by SDMA preprocessor 170 of FIG. 1.

For example, in accordance with some demonstrative embodiments of the invention, beamforming weights for the K intended recipients may be calculated, e.g., by weight calculation module 172, according to the channel state information obtained at block 424. For example, in the case of K=N, if H is a matrix containing the spatial signatures of all the intended recipients, a Zero Forcing (ZF) technique, as is known in the art, may be used to calculate a weight matrix W, e.g., such that H·W=I, wherein I is the identity matrix. Thus, the beamforming weights may form weight matrix W that is the inverse of the channel matrix H. Although the invention is not limited in this respect, in the case of K<N, W may be calculated, for example, as a pseudo-inverse of H.

According to some demonstrative embodiments of the invention, as indicated at block 434, method 400 may include calculating one or more additional vectors, e.g., up to N-K additional beamforming weight vectors, orthogonal to the K beamforming vectors corresponding to the K stations. The method may also include generating one or more noise dither sequences. For example, a Householder Transform technique, as is known in the art, may be used to complement the K orthogonal vectors with an additional N-K orthogonal vectors corresponding to N-K noise dither sequences.

As indicated at block 450, method 400 may include performing SDMA downlink transmission, e.g., as described above with reference to FIG. 2.

As indicated at block 460, method 400 may include detecting one or more ACK frames from the selected destination stations. Although the invention is not limited in this respect, user data frames for which a return ACK frame is detected may be removed from the outgoing frame queue of the relevant destination station, while frames for which a return ACK is not detected may be retransmitted in a subsequent subset of intended recipients.

As indicated at decision block 470, method 400 may include selecting a new subset as indicated at block 426, for example, if there are additional frames for transmission to at least one of the U selected stations, e.g., including one or more frames for which an ACK was not detected. It will be appreciated that the transmission method may repeat from subset selection if the predetermined time period set by the CTS-to-self frame did not end. If the wireless medium is no longer reserved for secure SDMA transmission by the AP, method 400 may include retransmitting another CTS-to-self frame, e.g., as indicated at block 422.

As indicated at decision block 480, checking whether there are additional frames for transmission to stations other than the U selected stations. Method 400 may include performing a new selection of destination stations, e.g., as indicated at block 410, if it is determined that there are additional frames for transmission to stations other than the U selected stations. As indicated at block 490, method 400 may end, e.g., when all outgoing frames of user data are handled.

Figure 5:
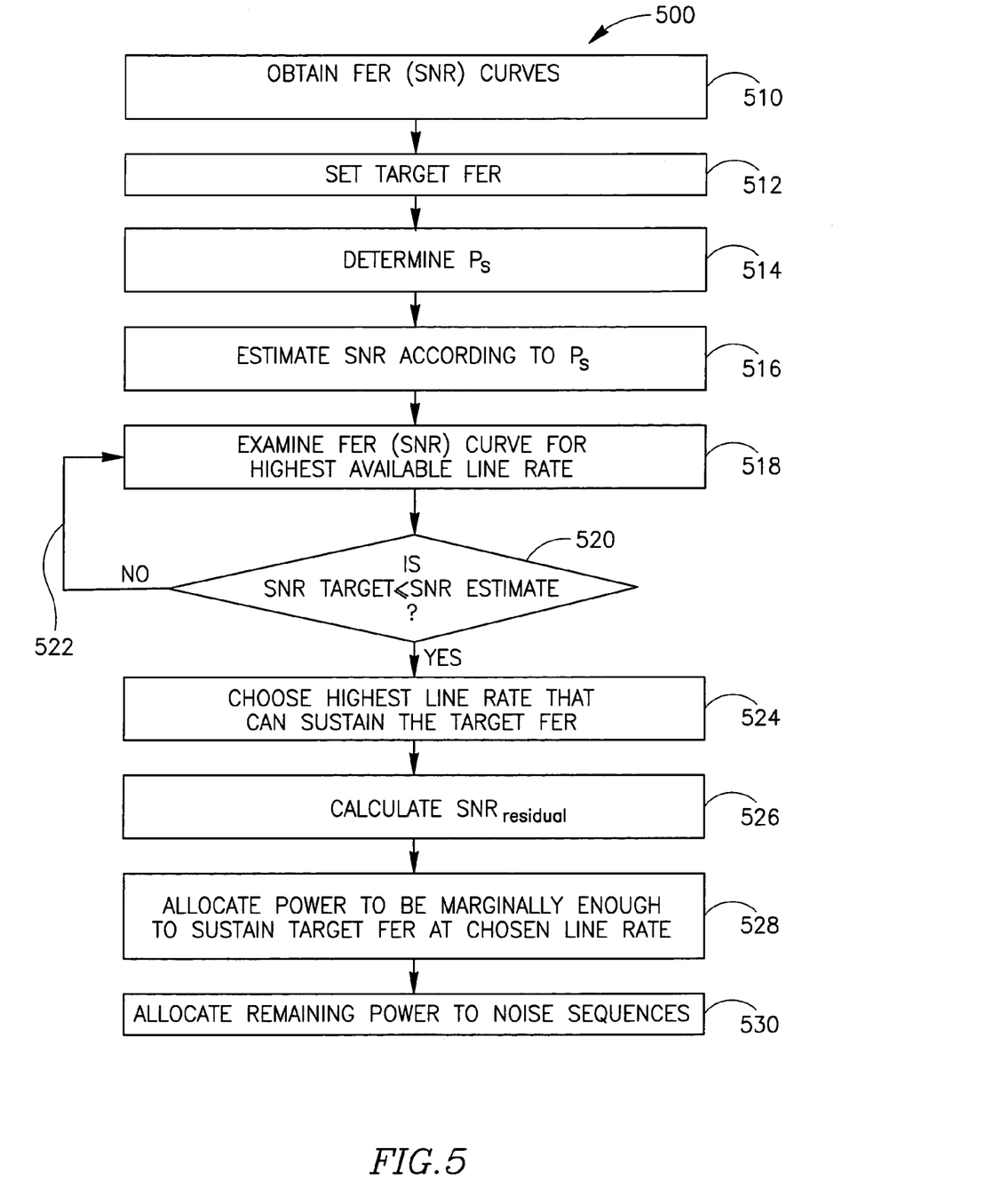
FIG. 5 is a schematic flowchart of a power allocation method in accordance with some demonstrative embodiments of the invention.

Reference is made to FIG. 5, which schematically illustrates a method 500 of power allocation according to some demonstrative embodiments of the invention. Although the invention is not limited in this respect, method 500 may be used to calculate the amount of power to be allocated to a signal to be transmitted to a destination station (K=1) signal. Method 500 may be performed, e.g., by power allocation module 174 (FIG. 1).

It will be appreciated by those of skill in the art that a wireless communication system, e.g., system 100 of FIG. 1, may support transmission in several transmission rates ("line rates"). For example, the 802.11a standards support eight line rates for transmitting data, ranging from 6 Mbps to 54 Mbps. In general, a higher line rate may provide greater throughput of data frames, but may require a higher signal-to-noise ratio (SNR) to support the transmission at a desired frame error rate (FER).

Although some demonstrative embodiments of the invention are described herein with reference to implementing the SNR parameter as a quality of service parameter, and/or the FER parameters as a error parameter, it will be appreciated by those of ordinary skill in the art that other embodiments of the invention may relate to any other suitable quality of service and/or error parameters may be implemented.

In accordance with some demonstrative embodiments of the invention, as indicated at block 510, power allocation method 500 may include obtaining one or more curves of frame error rate as a function of SNR, e.g., for one or more possible line rates. Although the invention is not limited in this respect, the error rate curves may be calculated offline, e.g., based on theoretical simulations, and stored, e.g., in one or more fixed tables in SDMA preprocessor 170 (FIG. 1). For example, the $FER_{(SNR)}$ curves may be obtained empirically by simulating or measuring the performance of an actual system in several SNR points in an additive white Gaussian noise (AWGN) regime, e.g., as is known in the art.

In accordance with some demonstrative embodiments of the invention, as indicated at block 512, method 500 may include setting a target error parameter, e.g., a target FER. For example, a 10% FER may be acceptable in a WLAN. Although the invention is not limited in this respect, the target FER may be based on a configurable system parameter that represents a desired trade-off between performance throughput and security. For example, a system administrator of the transmitting AP may be able to set a value for the tradeoff parameter, and the SDMA preprocessor may translate the parameter to a target FER.

According to some demonstrative embodiments of the invention, as indicated at block 514, method 500 may include determining an initial distribution of an available transmission power, denoted $P_T$, among the N channels. The distributed power, denoted $P_S$, allocated to the signal transmitted to the destination station may be calculated, for example, by dividing the available transmission power $P_T$, by the number of antennas N, e.g., as follows:

$$P_S = P_T/N \qquad (1)$$

Although the invention is not limited in this respect, $P_S$ may represent the maximum power to be allocated to a user signal, which may be derived, for example, from a configurable system parameter indicating a desired trade-off between performance and security. For example, the value of $P_S$ may be decreased from the value calculated by Equation 1 so as to be inversely proportional to the security level indicated in the tradeoff parameter. As $P_S$ is decreased, the security of the downlink transmission may be enhanced, since more energy may be dedicated to the noise sequences. Allocating more power to the noise sequences and less power to the user signal may result in a degraded SNR for a potential listening station, and may thus frustrate an attempt to detect the desired signal.

It will be appreciated by those skilled in the art that the method of FIG. 5 may be modified to enable power allocation to more than one signal to be transmitted to more than one station, respectively. For example, although the invention is not limited in this respect, in the case of simultaneous SDMA transmission to a plurality K of intended recipients, $P_S$ may represent the total amount of power distributed for transmission of the K user signals. The relative power allocation to distribute $P_S$ between the K stations may be determined by, for example, the subset selection algorithm of block 426 in FIG. 4.

According to some demonstrative embodiments of the invention, as indicated at block 516, method 500 may include estimating a first value of a QoS parameter that would result for a selected destination stations from allocating power $P_S$ to the user signal of that station. For example, the method may include estimating the SNR that would result for a selected destination station from allocating power $P_S$ to the user signal of that station. A transmitting AP, such as AP 110 of FIG. 1, may estimate, for example, the potential SNR based on channel state information, e.g., including the channel norm $\|H\|$, and/or the power of background thermal noise, denoted $P_{thermal}$. For example, the channel state information may be estimated from the preamble signal of a previous uplink transmission received from the destination station, e.g., a CTS frame and/or an ACK frame, as described above with reference to block 320 and/or block 424, respectively. Although the invention is not limited in this respect, the following formula may be used:

$$SNR = \frac{P_S \cdot \|H\|}{P_{thermal}} \qquad (2)$$

Although the invention is not limited in this respect, method 500 may include selecting a transmission rate at which to transmit to the selected destination station, for example, after calculating the first value of the QoS parameter, e.g., the estimated SNR corresponding to $P_S$, as indicated at blocks 518 through 524.

According to some demonstrative embodiments of the invention, the method may include determining a residual power corresponding to a difference between the first value of the QoS parameter and a second values of the QoS parameter corresponding to a desired quality of service; and allocating to the K channels of the N channels, e.g., the K channels of the user signals, transmission power corresponding to the residual power, e.g., as described in detail below.

As indicated at block 518, method 500 may include examining the $FER_{(SNR)}$ curve for the highest available line rate to lookup the SNR associated with the target FER ("the target SNR"). As indicated at block 520, method 500 may include comparing the target SNR with the estimated SNR, corresponding to power. $P_S$. It will be appreciated that if the target SNR is less than the estimated SNR, the current line rate may not be sufficient to sustain the target FER. Thus, as indicated at loop arrow 522, method 500 may include dropping to the next highest line and examining the corresponding $FER_{(SNR)}$ curve to lookup a new target SNR. As indicated at block 524, when the estimated SNR corresponding to $P_S$ is greater than or equal to the target SNR for the particular line rate, method 500 may include choosing that line rate for transmission. It will be appreciated that the chosen line rate may be highest available line rate that can sustain the target FER if power $P_S$ is allocated to the user signal.

According to some demonstrative embodiments of the invention, as indicated at block 526, method 500 may include calculating a residual SNR that may be available to the destination station when its allocated power is $P_S$. For example, the residual SNR may be calculated as the difference between the estimated SNR and the target SNR for the chosen line rate.

According to some demonstrative embodiments of the invention, as indicated at block 528, power allocation method 500 may include allocating power to the beam directed at the destination station to be marginally sufficient to sustain the target FER at the chosen line rate. Thus the intended recipient may receive the beam with just enough power to be able to decode the signal reliably at the chosen line rate. Although the invention is not limited in this respect, the allocated power, denoted $P'_S$, may be calculated according to the following formula:

$$P'_S = P_S - SNR_{residual} \qquad (3)$$

According to some demonstrative embodiments of the invention, for example, when additional noise sequences are generated, method 500 may include distributing the remaining available power to the noise sequences, as indicated at block 530. For example, the following formula may be applied:

$$P'_n = P_n + SNR_{residual} \qquad (4)$$

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

What is claimed is:

1. A method of power allocation for secure transmission in a wireless network using a spatial division multiple access transmission scheme, the method comprising:
    allocating transmission power to N spatial channels for a secure transmission to one or more destination stations by N antennas using an Access Point, such that the power to be received by each one of said one or more destination stations is not greater, by more than a predefined power margin, than a minimum power required for reception of a secure transmission at a desired quality of service, wherein N is an integer equal to 1 or greater; and
    allocating residual power for transmission of one or more dither sequences orthogonal to the secure transmission.

2. The method of claim 1, wherein said one or more destination stations comprise K destination stations, said method comprising:
    determining a residual power corresponding to a difference between first and second values of a quality of service parameter, said first value resulting from allocating predetermined transmission power to K channels of said N channels, and said second value corresponding to said desired quality of service; and
    allocating to said K channels transmission power corresponding to a difference between said predetermined transmission power and said residual power where K is an integer less than or equal to N.

3. The method of claim 2 comprising determining the second value of said quality of service parameter based on channel state information of said one or more destination stations.

4. The method of claim 3, wherein determining the second value of said quality of service parameter comprises determining a value of said quality of service parameter corresponding to a selected transmission rate.

5. The method of claim 4 comprising selecting said transmission rate from a plurality of transmission rates based on the first value of said quality of service parameter.

6. The method of claim 5, wherein said selecting comprises selecting said transmission rate such that an error parameter value corresponding to the first value of said quality of service parameter at said selected transmission rate, is higher than a predetermined error parameter value.

7. The method of claim 6, wherein said error parameter comprises a frame error rate.

8. The method of claim 2, wherein said quality of service parameter comprises a signal to noise ratio.

9. The method of claim 2 comprising estimating the first value of said quality of service parameter.

10. The method of claim 2, wherein said predetermined transmission power is based on a predetermined power allocation scheme.

11. The method of claim 1, wherein said one or more destination stations comprise K destination stations, said method comprising:
    generating said N spatial channels by applying at least one precoding matrix to a set of inputs including K transmissions intended to said K destination stations, respectively, and the one or more dither sequences,
    wherein said precoding matrix includes K beamforming vectors based on channel state information of said K stations, respectively, and forming the dither sequences as one or more additional vectors orthogonal to said beamforming vectors where K and N are integers and K is less than or equal to N.

12. The method of claim 11, wherein said one or more dither sequences comprise N-K dither sequences.

13. The method of claim 11 comprising determining one or more of said beamforming vectors based on one or more transmissions received from said K stations.

14. An apparatus to securely communicate in a wireless network using a spatial division multiple access transmission scheme, the apparatus comprising:
a power allocator to allocate transmission power to N spatial channels for secure transmission to one or more destination stations by N antennas, such that the power to be received by each one of said one or more destination stations is not greater, by more than a predefined power margin, than a minimum power required for reception of the secure transmission at a desired quality of service whereby said power allocator is to allocate residual power for transmission of one or more dither sequences orthogonal to the secure transmission and where N is an integer equal to or greater than 1.

15. The apparatus of claim 14, wherein said one or more destination stations comprise K destination stations, said power allocator is able to:
determine a residual power corresponding to a difference between first and second values of a quality of service parameter, said first value resulting from allocating a predetermined transmission power to K channels of said N channels, and said second value corresponding to said desired quality of service; and
allocate to said K channels transmission power corresponding to a difference between said predetermined transmission power and said residual where K is an integer equal to 1 or greater than or equal to N.

16. The apparatus of claim 15, wherein said power allocator is able to determine the second value of said quality of service parameter based on channel state information of said one or more destination stations.

17. The apparatus of claim 16, wherein the second value of said quality of service parameter corresponds to a selected transmission rate.

18. The apparatus of claim 17, wherein said power allocator is able to select said transmission rate from a plurality of transmission rates based on the first value of said quality of service parameter.

19. The apparatus of claim 18, wherein an error parameter value corresponding to the first value of said quality of service parameter at said selected transmission rate, is higher than a predetermined error parameter value.

20. The apparatus of claim 19, wherein said error parameter comprises a frame error rate.

21. The apparatus of claim 15, wherein said quality of service parameter comprises a signal to noise ratio.

22. The apparatus of claim 15, wherein said power allocator is able to estimate the first value of said quality of service parameter.

23. The apparatus of claim 15, wherein said power allocator is able to determine the transmission power corresponding to said first value based on a predetermined power allocation scheme.

24. The apparatus of claim 15, wherein said one or more destination stations comprise K destination stations, said apparatus comprising a:
precoder to generate said N spatial channels by applying at least one precoding matrix to a set of inputs including K transmissions intended to said K destination stations, respectively and the one or more dither sequences,
wherein said precoding matrix includes K beamforming vectors based on channel state information of said K stations, respectively, and forming the dither sequences as one or more additional vectors orthogonal to said beamforming vectors, where K is an integer equal to 1 or greater and K is less than or equal to N.

25. The apparatus of claim 24, wherein said one or more dither sequences comprise N-K dither sequences.

26. The apparatus of claim 24 comprising a vector calculator to determine one or more of said beamforming vectors based on one or more transmissions received from said K stations.

27. A system of secure communication in a wireless network using a spatial division multiple access transmission scheme, the system comprising:
a plurality of stations;
an access point to allocate transmission power to N spatial channels to transmit a secure transmission to one or more destination stations of said plurality of stations by N antennas, such that the power to be received by each one of said one or more destination stations is not greater, by more than a predefined power margin, than a minimum power required for reception of the secure transmission at a desired quality of service whereby said access point is to allocate residual allocated power for transmission of one or more dither sequences orthogonal to the secure transmission where N is an integer equal to or greater than 1.

28. The system of claim 27, wherein said one or more destination stations comprise K destination stations, said power allocator is able to:
determine a residual power corresponding to a difference between first and second values of a quality of service parameter, said first value resulting from allocating a predetermined transmission power to K channels of said N channels, and said second value corresponding to said desired quality of service; and
allocate to said K channels transmission power corresponding to a difference between said predetermined transmission power and said residual power where K is an integer equal to 1 or greater and K is less than or equal to N.

29. The system of claim 28 wherein said access point is able to determine the second value of said quality of service parameter based on channel state information of said one or more destination stations.

30. The system of claim 29, wherein the second value of said quality of service parameter corresponds to a selected transmission rate.

31. The system of claim 30, wherein said access point is able to select said transmission rate from a plurality of transmission rates based on the first value of said quality of service parameter.

32. The system of claim 31, wherein an error parameter value corresponding to the first value of said quality of service parameter at said selected transmission rate, is higher than a predetermined error parameter value.

33. The system of claim 32, wherein said error parameter comprises a frame error rate.

34. The system of claim 28, wherein said quality of service parameter comprises a signal to noise ratio.

35. The system of claim 28, wherein said access point is able to estimate the first value of said quality of service parameter.

36. The system of claim 28, wherein said access point is able to determine the transmission power corresponding to said first value based on a predetermined power allocation scheme.

37. The system of claim 27, wherein said one or more destination stations comprise K destination stations, said access point is able to generate said N spatial channels by applying at least one precoding matrix to a set of inputs including K transmissions intended to said K destination stations, respectively, and one or more dither sequences, wherein said precoding matrix includes K beamforming vectors based on channel state information of said K stations, respectively, and forming the dither sequences as one or more additional vectors orthogonal to said beamforming vectors, where K is an integer equal to 1 or greater and K is less than or equal to N.

38. The system of claim 37, wherein said one or more dither sequences comprise N-K dither sequences.

39. The system of claim 37, wherein said access point is able to determine one or more of said beamforming vectors based on one or more transmissions received from said K stations.

* * * * *